United States Patent
Miller et al.

(10) Patent No.: US 12,165,817 B2
(45) Date of Patent: Dec. 10, 2024

(54) CONFIGURABLE ELECTROMECHANICAL ROTATABLE KNOB

(71) Applicant: Robert Bosch GmbH, Stuttgart (DE)

(72) Inventors: James Stephen Miller, Dexter, MI (US); Paul Wickett, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 17/517,383

(22) Filed: Nov. 2, 2021

(65) Prior Publication Data

US 2023/0133999 A1  May 4, 2023

(51) Int. Cl.
| | | |
|---|---|---|
| *H01H 19/14* | (2006.01) | |
| *B60K 35/10* | (2024.01) | |
| *G06F 3/01* | (2006.01) | |
| *B62D 13/06* | (2006.01) | |

(52) U.S. Cl.
CPC ............. *H01H 19/14* (2013.01); *B60K 35/10* (2024.01); *G06F 3/016* (2013.01); *B62D 13/06* (2013.01); *H01H 2231/026* (2013.01)

(58) Field of Classification Search
CPC .......... H01H 19/14; B60K 35/10; G06F 3/016
See application file for complete search history.

(56) References Cited

U.S. PATENT DOCUMENTS

| | | | |
|---|---|---|---|
| 8,798,860 B2 | 8/2014 | Dechamp | |
| 9,132,856 B2 | 9/2015 | Shepard | |
| 9,616,923 B2 | 4/2017 | Lavoie et al. | |
| 10,144,452 B2 | 12/2018 | Lavoie et al. | |
| 10,173,722 B2 | 1/2019 | Pourrezaei Khaligh et al. | |
| 2017/0101130 A1* | 4/2017 | Lavoie | B62D 1/02 |
| 2017/0113722 A1* | 4/2017 | Lavoie | B62D 6/002 |
| 2017/0297619 A1* | 10/2017 | Lavoie | B62D 15/024 |
| 2019/0009815 A1* | 1/2019 | Lavoie | B62D 13/06 |
| 2019/0061816 A1 | 2/2019 | Stabel et al. | |
| 2020/0353969 A1 | 11/2020 | Sypitkowski et al. | |

FOREIGN PATENT DOCUMENTS

| | | | | |
|---|---|---|---|---|
| DE | 102016120203 A1 * | 4/2017 | ............. | B62D 13/06 |
| JP | 6896178 B1 * | 6/2021 | ............. | G06F 3/016 |

OTHER PUBLICATIONS

Salcido-Zarco, Alejandro, Trailer Reverse Assist. Optical Follow Me, Jul. 2017, ITESO, pp. 1-142 (Year: 2017).*

* cited by examiner

*Primary Examiner* — Justin S Lee
(74) *Attorney, Agent, or Firm* — Michael Best & Friedrich LLP

(57) ABSTRACT

A system and method for operating a rotatable knob module with adjustable tactile feedback. The rotatable knob module includes a knob configured to continuously rotate about a center axis and an electronic processor. The electronic processor is configured to determine a current trailer angle, define a virtual center position of the knob based on the current trailer angle, and adjust a rotational torque of the knob when the knob is rotated from a first rotational position to a second rotational position based on a relative virtual rotational distance of the second rotational position from the virtual center position.

18 Claims, 4 Drawing Sheets

CONFIGURABLE ELECTROMECHANICAL ROTATABLE KNOB

FIELD

Embodiments presented herein relate to a rotatable electromechanical knob for use in an automotive trailer reverse assistance system.

BACKGROUND

Vehicles, such as automobiles, trucks, SUVs, vans, recreational vehicles, etc., may be equipped with a multiple camera system. One such camera system may be part of, for example, an automotive trailer reverse assistance system. An automotive trailer reverse system provides a rear view (and, in some systems, trajectory guidance) to a user of the vehicle to aid in steering an automotive coupled to a trailer. Some automotive trailer reverse assistance systems are partially autonomous and may utilize a separate input (for example, a rotatable knob) for a user to command the assistance system to accordingly steer the trailer via the steering wheel. In the case of a rotatable knob, it may be difficult to adaptively convey to the user a relative position of the trailer to the vehicle beyond visual and/or audio warning.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
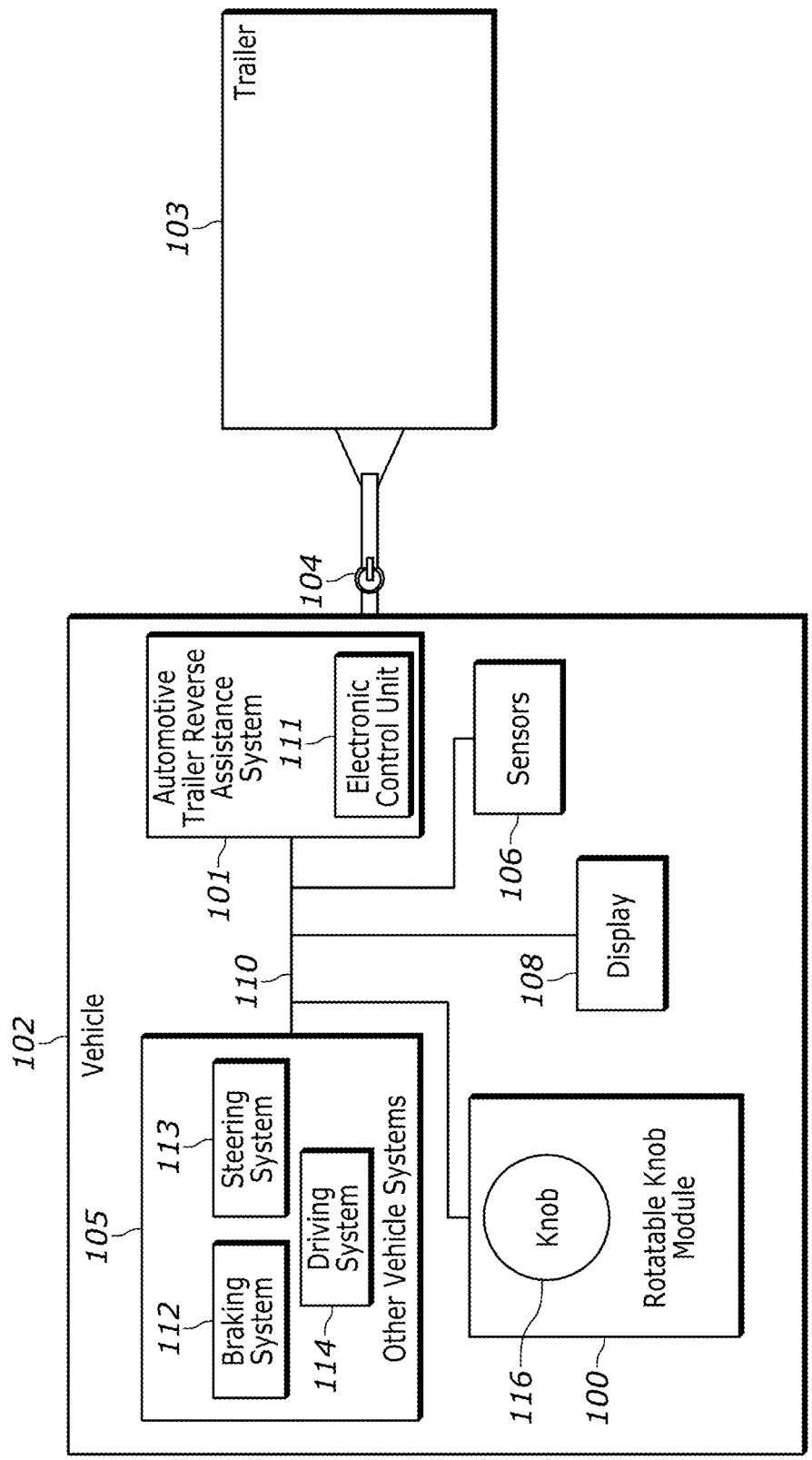
FIG. 1 is a block diagram of a rotatable knob module for an automotive trailer system for a vehicle, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

SUMMARY

As noted, automotive vehicles may be equipped with several driving assistance systems. In some, for example, an automotive trailer reverse assistance system, may utilize an input device separate from the steering wheel for a user of the vehicle 102 to provide input through to the assistance system. While rotatable knobs are normally used to provide such feedback, traditional mechanical knobs may have limited tactile feedback due to their solely mechanical features (for example, mechanical detents and rotational end stops). Such features may not provide enough discernable feedback to the user to aide in communicating information regarding the relative position of the trailer. Additionally, knobs with end stops may require a user to set the knob back to an original position after use. It is therefore advantageous to utilize continuous knobs with tactile feedback including detents and rotational end stops, which are adjustable via software, to provide more customizable, and relative, tactile feedback.

Accordingly, systems and methods are provided herein for, among other things, a rotatable electromechanical knob with customizable resistive torque.

One embodiment provides a rotatable knob module for an automotive trailer reverse assistance system. The rotatable knob module includes a knob configured to continuously rotate about a center axis and an electronic processor. The electronic processor is configured to determine a current trailer angle, define a virtual center position of the knob based on the current trailer angle, and adjust a rotational torque of the knob when the knob is rotated from a first rotational position to a second rotational position based on a relative virtual rotational distance of the second rotational position from the virtual center position.

Another embodiment provides for a rotatable knob module system for an automotive trailer reverse assistance system. The knob module system includes a knob configured to continuously rotate about a center axis and an electronic processor. The electronic processor is configured to determine a current trailer angle, define a virtual center position of the knob based on the current trailer angle, and adjust a rotational torque of the knob when the knob is rotated from a first rotational position to a second rotational position based on a relative virtual rotational distance of the second rotational position from the virtual center position.

Another embodiment provides a method of operating a rotatable knob module for an automotive trailer reverse assistance system. The knob module includes a knob configured to continuously rotate about a center axis. The method includes determining a current trailer angle, defining a virtual center position of the knob based on the current trailer angle, and adjusting a rotational torque of the knob when the knob is rotated from a first rotational position to a second rotational position based on a relative virtual rotational distance of the second rotational position from the virtual center position.

DETAILED DESCRIPTION

Before any embodiments are explained in detail, it is to be understood that the examples presented herein are not limited in their application to the details of construction and the arrangement of components set forth in the following description or illustrated in the drawings. Embodiments may be practiced or carried out in various ways. For example, while the systems and methods are described herein in terms of automotive systems, such systems and methods may be applied to other types of vehicle systems.

Also, it is to be understood that the phraseology and terminology used herein is for the purpose of description and should not be regarded as limiting. The terms "mounted,"

"connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software-based devices, as well as a plurality of different structural components may be used to implement the embodiments presented herein. Some embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more electronic processors. Therefore, it should be noted that a plurality of hardware and software-based devices, as well as a plurality of different structural components may be utilized to implement the embodiments presented. For example, "control units" and "controllers" described in the specification can include one or more electronic processors, one or more memory modules including non-transitory computer-readable medium, one or more input/output interfaces, and various connections (for example, a system bus) connecting the components.

For ease of description, some of the example systems presented herein are illustrated with a single exemplar of each of its component parts. Some examples may not describe or illustrate all components of the systems. Other embodiments may include more or fewer of each of the illustrated components, may combine some components, or may include additional or alternative components.

It should be noted that, while embodiments of the invention are described particularly for use with automotive trailer reverse assistance programs, other uses with different applications are possible.

FIG. 1 is a block diagram of one exemplary embodiment of rotatable knob module 100 for an automotive trailer system 101 for a vehicle 102 coupled to a trailer 103 via a coupling 104 (for example, a trailer hitch). The rotatable knob module 100 may be mounted on, or integrated into, the vehicle 102. The vehicle 102 may be partially autonomous, meaning that the vehicle 102 is configured to drive itself with limited input from a user of the vehicle 102 or alternatively may have no automation. The systems and methods described herein may be used with any vehicle 102 capable of operating partially, being controlled manually by a user of the vehicle 102, or some combination of both.

In the example illustrated, the vehicle 102 includes, in addition to the automotive trailer reverse assistance system 101 and rotatable knob module 100, other vehicle systems 105, sensors 106, and a display 108. The systems, such as the automotive trailer reverse assistance system 101, and the components of the vehicle 102, including the rotatable knob module 100, along with other various modules and components, are electrically coupled to each other by or through one or more control or data buses (for example, the bus 110), which enable communication therebetween. The use of control and data buses for the interconnection between, and communication among, the various modules and components would be known to a person skilled in the art in view of the invention described herein. In some embodiments, the bus 110 is a Controller Area Network (CAN™) bus. In some embodiments, the bus 110 is an automotive Ethernet™, a FlexRay™ communications bus, or another suitable wired bus. In alternative embodiments, some or all of the components of the vehicle 102 may be communicatively coupled using suitable wireless modalities (for example, Bluetooth™ or another kind of near field communication).

The automotive trailer reverse assistance system 101 provides guidance to a user of the vehicle 102 to steer the trailer 103 coupled to the vehicle 102 when the vehicle 102 is in a reverse gear. The automotive trailer reverse assistance system 101 includes an electronic control unit 111, which is configured to receive measurements or readings (sometimes referred to as sensor telemetry) from the one or more sensors 106 of the vehicle 102. The electronic control unit 111 is further configured to determine vehicle path data (for example, a predicted trajectory of the vehicle 102 and, thus, the trailer 103) based on the sensor telemetry when the vehicle 102 is in a reverse gear.

The sensors 106 determine one or more attributes of the vehicle 102 and trailer 103 and their surrounding environment and transmit information regarding those attributes to the automotive trailer reverse assistance system 101, as well as one or more of the other vehicle systems 105. The sensors 106 may include, for example, vehicle control sensors (for example, sensors that detect accelerator pedal position, brake pedal position, and steering wheel position), wheel speed sensors, vehicle speed sensors, yaw sensors, force sensors, odometry sensors, and vehicle proximity sensors (for example, camera, radar, LIDAR, and ultrasonic). In some embodiments, the sensors 106 include one or more cameras configured to capture one or more images of the environment surrounding the vehicle 102 and/or trailer 103 according to their respective fields of view. The cameras may include multiple types of imaging devices/sensors, each of which may be located at different positions on the interior or exterior of the vehicle 102 and/or trailer 103. It should be noted that, in some embodiments, the trailer 103 may also include one or more of the sensors 106.

The electronic control unit 111, in some embodiments, may transmit the vehicle path data to the one or more other vehicle systems 105 to automatically adjust movement of the vehicle 102 (and thus, the trailer 103) while the vehicle 102 is in the reverse gear. For example, the electronic control unit 111 may transmit commands to a braking system 112, a steering system 113, and/or a driving system 114, for example, to brake, accelerate, and/or steer the vehicle 102 respectively. Alternatively (in embodiments where the vehicle 102 has no automation) or additionally, the electronic control unit 111 of the automotive trailer reverse assistance system 101 may utilize the display 108 to generate, from the vehicle path data and sensor telemetry received from the sensors 106, a visual of a predicted trajectory of the vehicle 102 and trailer 103.

The display 108 provides visual output, for example, a graphic user interface (GUI) having graphical elements or indicators (for example, fixed or animated icons), lights, colors, text, images (for example, from one or more cameras of the sensors 106), combinations of the foregoing, and the like. The display 108 includes a suitable display device for displaying the visual output, for example, an instrument cluster, a mirror, a heads-up display, a center console display screen (for example, a liquid crystal display (LCD) touch screen, or an organic light-emitting diode (OLED) touch screen), or through other suitable devices.

The rotatable knob module 100 provides an interface between the automotive trailer reverse assistance system 101 and the user of the vehicle 102. The rotatable knob module 100 is communicatively coupled to the electronic control unit 111 and receives input from the user of the vehicle 102. The rotatable knob module also provides to and receives electric signals from the electronic control unit 111. The user of the vehicle 102 provides commands to the automotive trailer reverse assistance system 101 via the rotatable knob module 100 to, for example, affect a desired reverse trajectory of the vehicle 102 and trailer 103 and/or steer the vehicle 102. The rotatable knob module 100 includes a knob 116 configured to continuously mechanically rotate about a center axis. The knob 116 does not have any mechanical detents and end stops. As explained below in more detail, the rotatable knob module 100 is configured to provide customizable tactile feedback, via the knob 116, to the user of the vehicle 102 based on the received information.

Figure 2:
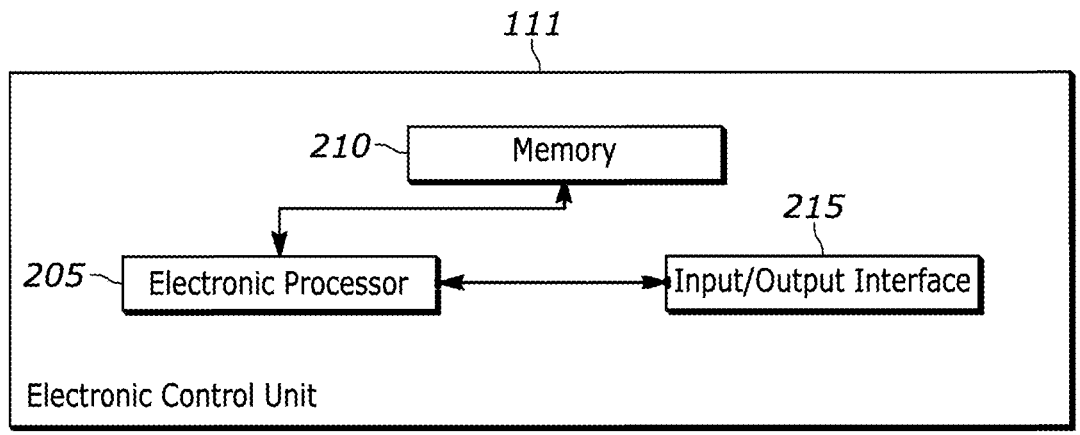
FIG. 2 is a block diagram of the rotatable knob module of FIG. 1, according to some embodiments.

FIG. 2 illustrates an exemplary embodiment of the electronic control unit 111, which includes an electronic processor 205 (for example, a microprocessor, application specific integrated circuit, etc.), a memory 210, and an input/output interface 215. The memory 210 may be made up of one or more non-transitory computer-readable media and includes at least a program storage area and a data storage area. The program storage area and the data storage area can include combinations of different types of memory, such as read-only memory ("ROM"), random access memory ("RAM") (for example, dynamic RAM ("DRAM"), synchronous DRAM ("SDRAM"), etc.), electrically erasable programmable read-only memory ("EEPROM"), flash memory, or other suitable memory devices. The electronic processor 205 is coupled to the memory 210 and the input/output interface 28. The electronic processor 205 sends and receives information (for example, from the memory 210 and/or the input/output interface 215) and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for autonomous vehicle control, and for performing methods as described herein.

The input/output interface 215 transmits and receives information from devices external to the electronic control unit 111 over one or more wired and/or wireless connections, for example, components of the vehicle 102 via the bus 110, including the rotatable knob module 100. The input/output interface 215 receives user input, provides system output, or a combination of both. The input/output interface 215 may also include other input and output mechanisms (for example, a transceiver, which is not shown), which for brevity are not described herein and which may be implemented in hardware, software, or a combination of both.

It should be understood that although FIG. 2 illustrates only a single electronic processor 205, memory 210, and input/output interface 215, alternative embodiments of the electronic control unit 111 may include multiple processing units, memory modules, and/or input/output interfaces. It should also be noted that the vehicle 102 may include other electronic control units, each including similar components as, and configured similarly to, the electronic control unit 111. In some embodiments, the electronic control unit 111 is implemented partially or entirely on a semiconductor (for example, a field-programmable gate array ["FPGA"] semiconductor) chip. Similarly, the various modules and control units described herein may be implemented as individual controllers, as illustrated, or as components of a single controller. In some embodiments, a combination of approaches may be used.

Some or all of the components of electronic control unit 111 may be dispersed and/or integrated into other devices/components of the system 100 (for example, in the display 108, the rotatable knob module 100, and a vehicle control module or VCM, not shown, of the vehicle 102).

Figure 3:
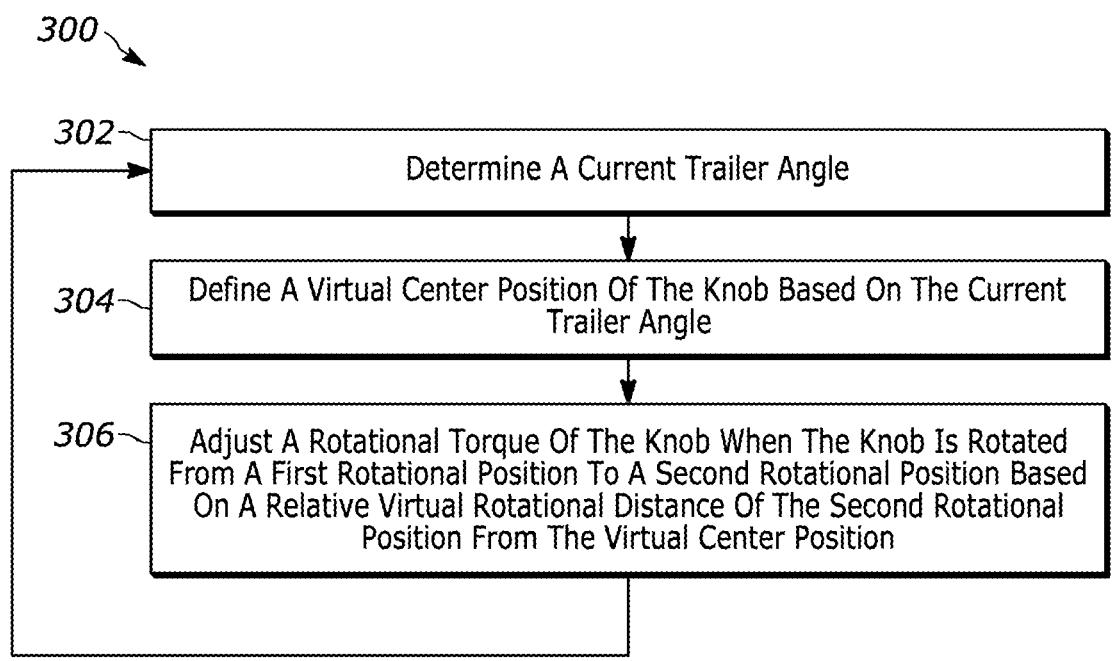
FIG. 3 is a flowchart illustrating a method of operating the rotatable knob module of FIG. 2, according to some embodiments.

FIG. 3 illustrates an exemplary method 300 of operating the rotatable knob module 100 of the automotive trailer reverse assistance system 101. As an example, the method 300 is explained in terms of the electronic control unit 111, in particular the electronic processor 205. However, portions of the method 300 may be distributed among multiple devices (for example, one or more additional control units/controllers/processors of or connected to the vehicle 102).

At block 302, the electronic processor 205 determines a current trailer angle of the trailer 103. The trailer angle is the yaw angle of the of the trailer 103 relative to the coupling 104 at the rear of the vehicle 102. The electronic processor 205 may determine the current trailer angle from measurement and information from the sensors 106. For example, the electronic processor 205 may determine the trailer angle by analyzing one or more images from one or more rear-facing camera sensors of the vehicle 102.

At block 304, the electronic processor 205 defines a virtual center position of the knob 116 based on the current trailer angle. The virtual center position is a position defined in software that corresponds to an actual original physical rotational position of the knob 116. For example, when the virtual center position is set at the current physical rotational position of the knob 116, as the knob 116 is rotated away from the current physical rotational position (for example, rotated 90 degrees), the relative virtual distance (rotational angle) of the virtual rotational position of the knob 116 from the virtual center position is increased (for example, 90 degrees).

As the knob 116 is moved from a first rotational position to a second rotational position, the electronic processor 205 adjusts a rotational (resistive) torque of the knob based on the relative virtual rotational distance of the second rotational position from the virtual center position (block 306). For example, as the knob 116 is rotated away from the physical position corresponding to the virtual center position (thus increasing the relative virtual distance from the virtual center position) the electronic processor 205 may provide a pulsed electrical current to the rotatable knob module 100 to cause the rotational torque to increase and/or decrease as the knob 116 is rotated away from the virtual center position. The current relative virtual rotational distance may then be computed by the electronic processor 205 to accordingly adjust a reverse steering of the vehicle 102.

The rotational torque of the knob 116, and patterns thereof, may be adjusted at any rotational angle from the virtual center position via the electronic processor 205. This allows for various, customizable rotational torque profile configurations of the knob 116, including those that may provide a tactile simulation (a similar "feel") to detents and/or end stops. For example, the electronic processor 205 may be further configured to define a virtual rotational limit of the knob 116 based on the virtual center position. The rotational torque of the knob 116 may then be adjusted based on the relative virtual distance of the second rotational position from the virtual rotational limit. For example, as the knob 116 is rotated counterclockwise away from the virtual center position, as the relative virtual distance approaches the defined virtual rotational limit, the rotational torque of the knob 116 increases (for example, to tactilely simulate an end stop of a mechanically non-continuous knob). In some embodiments, there are multiple virtual rotational limits (for example, a virtual clockwise rotational limit, which is approached when the knob 116 is rotated clockwise, and a virtual counterclockwise rotational limit, which is approached when the knob 116 is rotated counterclockwise).

Figure 4A:
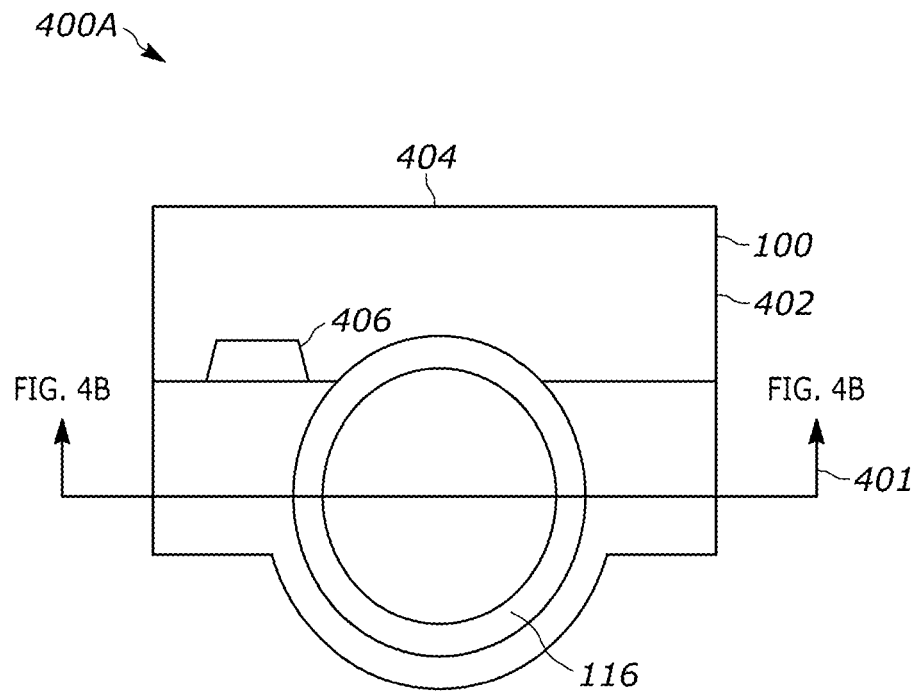
FIG. 4A is a top-down view of the rotatable knob module of FIG. 2, according to some embodiments.
Figure 4B:
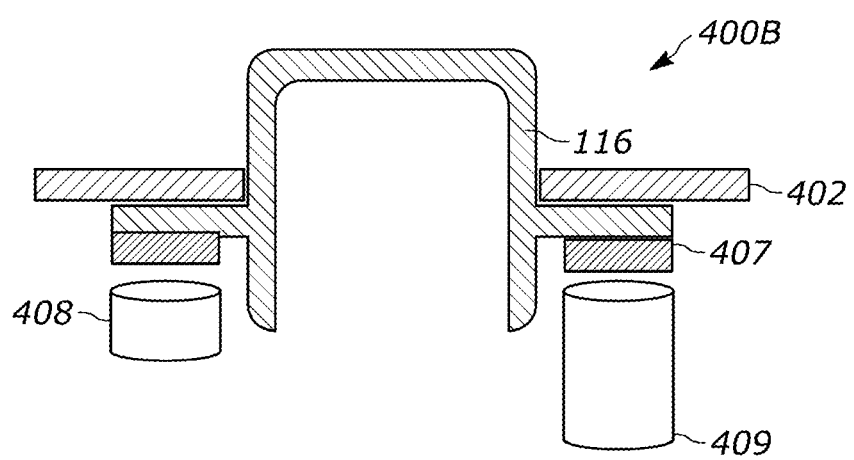
FIG. 4B is a cross-sectional view of the rotatable knob module of FIG. 2, according to some embodiments.

FIGS. 4A is a top-down view 400A of an exemplary configuration of the rotatable knob module 100. FIG. 4B is a cross-section view 400B of rotatable knob module 100 of FIG. 4A cut through the plane indicated by line 401 of FIG. 4A. As shown in the view 400A of FIG. 4A, the rotatable knob module 100 includes the knob 116 enclosed in a housing 402. In some embodiments, the rotatable knob module 100 includes one or more user inputs and/or one or more visual indication devices. The rotatable knob module 100 may include, for example, one or more pushbuttons and/or light-emitting diodes (LEDs). In the illustrated embodiment, the rotatable knob module 100 includes a pushbutton 404 and a LED 406.

Moving to FIG. 4B, the rotatable knob module 100 in the illustrated embodiment includes a metallic ring 407 coupled to the knob 116 and disposed about the center axis of the knob 116. The metallic ring 407 may be any type of electromagnetically conductive material (for example, steel). The rotatable knob module 100 of FIG. 4B also includes an electromagnet 408, which is electromagnetically coupled to the metallic ring 407, and an encoder 409. The electronic processor 205 may, in the illustrated embodiment, transmit a pulsed electrical signal to the electromagnet 408. Based on the pulsed electrical signal, the degree of the electromagnetic coupling between the electromagnet 408 and the metallic ring 407 is adjusted, effectively increasing or decreasing the rotational torque. The electronic processor 205 may adjust the rotational torque of the knob 116 by affecting a duty cycle of the pulsed electrical signal, for example, based on the relative virtual rotational distance of the knob 116 from the virtual center position.

The encoder 408 is communicatively coupled to the electronic processor 205 and is configured to measure and transmit, to the electronic processor 205, the rotational position of the knob 116. The electronic processor 205 may then accordingly, based on the received measurement, determine the relative virtual rotational distance of the knob 116 from the virtual center position.

In some embodiments, the virtual center position may be redefined to be at a new virtual center position different from an originally set virtual center position via a user input (for example, the pushbutton 404 or the GUI of the display 108). Custom degrees/patterns of rotational torque may also be defined, via user input, at certain virtual rotational distances/rotational positions in some embodiments.

Figure 5:
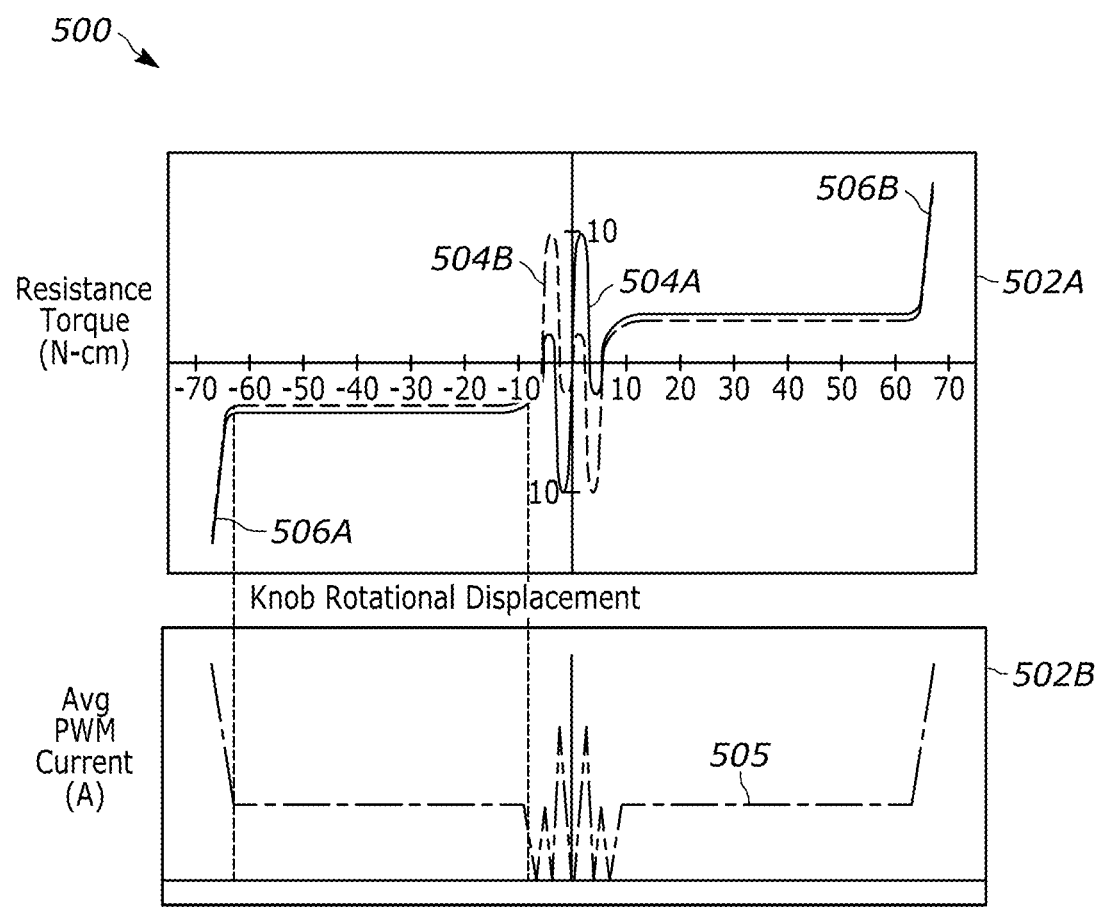
FIG. 5 is a dual chart including a graph of the rotational torque over rotational position displacement and a graph of the corresponding average current of the related pulsed electrical current of the rotatable knob module of FIG. 2, according to some embodiments.

FIG. 5 is a dual chart 500 including a graph 502A of the rotational torque over rotational position displacement from the virtual center position and a corresponding graph 502B of the average current of the pulsed electrical current of the rotatable knob module 100. Graph 502A includes a profile 504A of the generated rotational torque when rotated in a first rotational direction (for example, clockwise) from a first virtual rotational limit 506A to a second virtual rotational limit 506B and a profile 504B of the generated rotational torque when rotated in a second rotational direction from the second virtual rotational limit 506B to the first virtual rotational limit 506A. Graph 502B includes a profile 505 of the average current of the pulsed electrical signal corresponding to both respective profiles 504A and 504B of rotational torque of the graph 502A which, according to the illustrated embodiment, is the same for both profiles 504A and 504B. As illustrated, the rotational torque, for both profiles 504A and 504B, is oscillated when the virtual rotational distance of the knob 116 is relatively close to (for example, within 10 degrees of) the virtual center position (point 508), tactilely simulating, to a user operating the knob 116, a mechanical detent. As also illustrated, as the virtual rotational distance of the knob 116 approaches either of the virtual rotational limits 506A and 506B, the rotational torque is increased, tactilely simulating, to a user operating the knob 116, a mechanical end stop.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Thus, embodiments provide, among other things, a rotatable electromechanical knob with customizable resistive torque. Various embodiments are set forth in the following claims.

What is claimed is:

1. A rotatable knob module for an automotive trailer reverse assistance system, the rotatable knob module comprising:
   a knob configured to continuously rotate about a center axis; and
   an electronic processor configured to
      determine a current trailer angle,
      define a virtual center position of the knob based on the current trailer angle, and
      adjust a rotational torque of the knob when the knob is rotated from a first rotational position to a second rotational position based on a relative virtual rotational distance of the second rotational position from the virtual center position.

2. The rotatable knob module of claim 1, further comprising
a metallic ring coupled to the knob and disposed about the center axis and
an electromagnet electromagnetically coupled to the metallic ring, wherein the electronic processor adjusts the rotational torque of the knob by transmitting, to the electromagnet, a pulsed electrical current, a duty cycle of the electrical current being based on the relative virtual rotational distance.

3. The rotatable knob module of claim 1, further comprising an encoder communicatively coupled to the electronic processor and configured to measure the first rotational position and the second rotational position, and wherein the electronic processor is further configured to receive the first rotational position and second rotational position from the encoder.

4. The rotatable knob module of claim 1, wherein the electronic processor is configured to redefine the virtual center position to be at a rotational position different from the first rotational position in response to a user input.

5. The rotatable knob module of claim 1, wherein the electronic processor is further configured to define a virtual rotational limit of the knob based on the virtual center position and wherein the rotational torque of the knob is further adjusted based on the relative virtual distance of the second rotational position from the virtual rotational limit.

6. The rotatable knob module of claim 1, wherein the electronic processor is further configured to receive the current trailer angle from the automotive trailer reverse assistance system and transmit the relative virtual rotational distance to the automotive trailer reverse assistance system.

7. A rotatable knob module system for an automotive trailer reverse assistance system, the knob module system comprising:
a knob configured to continuously rotate about a center axis; and
an electronic processor configured to
determine a current trailer angle,
define a virtual center position of the knob based on the current trailer angle, and
adjust a rotational torque of the knob when the knob is rotated from a first rotational position to a second rotational position based on a relative virtual rotational distance of the second rotational position from the virtual center position.

8. The rotatable knob module system of claim 7, further comprising
a metallic ring coupled to the knob and disposed about the center axis and
an electromagnet electromagnetically coupled to the metallic ring, wherein the electronic processor adjusts the rotational torque of the knob by transmitting, to the electromagnet, a pulsed electrical current, a duty cycle of the electrical current being based on the relative virtual rotational distance.

9. The rotatable knob module system of claim 7, further comprising an encoder communicatively coupled to the electronic processor and configured to measure the first rotational position and the second rotational position, and wherein the electronic processor is further configured to receive the first rotational position and second rotational position from the encoder.

10. The rotatable knob module system of claim 7, wherein the electronic processor is configured to redefine the virtual center position to be at a rotational position different from the first rotational position in response to a user input.

11. The rotatable knob module system of claim 7, wherein the electronic processor is further configured to define a virtual rotational limit of the knob based on the virtual center position and wherein the rotational torque of the knob is further adjusted based on the relative virtual distance of the second rotational position from the virtual rotational limit.

12. The rotatable knob module system of claim 7, wherein the electronic processor is further configured to receive the current trailer angle from the automotive trailer reverse assistance system and transmit the relative virtual rotational distance to the automotive trailer reverse assistance system.

13. A method of operating a rotatable knob module for an automotive trailer reverse assistance system, the knob module including a knob configured to continuously rotate about a center axis, the method comprising:
determining a current trailer angle,
defining a virtual center position of the knob based on the current trailer angle, and
adjusting a rotational torque of the knob when the knob is rotated from a first rotational position to a second rotational position based on a relative virtual rotational distance of the second rotational position from the virtual center position.

14. The method of claim 13, wherein the rotatable knob module includes a metallic ring coupled to the knob and disposed about the center axis and an electromagnet electromagnetically coupled to the metallic ring, and wherein adjusting the rotational torque of the knob includes transmitting, to the electromagnet, a pulsed electrical current, a duty cycle of the electrical current being based on the relative virtual rotational distance.

15. The method of claim 13, wherein the rotatable knob module further includes an encoder configured to measure the first rotational position and the second rotational position, and wherein the method further includes receiving the first rotational position and second rotational position from the encoder.

16. The method of claim 13, the method further comprising redefining the virtual center position to be at a rotational position different from the first rotational position in response to a user input.

17. The method of claim 13, the method further including defining a virtual rotational limit of the knob based on the virtual center position and wherein the rotational torque of the knob is further adjusted based on the relative virtual distance of the second rotational position from the virtual rotational limit.

18. The method of claim 13, method further including receiving the current trailer angle from the automotive trailer reverse assistance system and transmitting the relative virtual rotational distance to the automotive trailer reverse assistance system.

* * * * *